United States Patent
Son et al.

(10) Patent No.: US 8,195,054 B2
(45) Date of Patent: Jun. 5, 2012

(54) APPARATUS AND METHOD FOR TRANSMITTING AND RECEIVING AN INFORMATION SYMBOL IN A VISIBLE LIGHT COMMUNICATION SYSTEM FOR COLOR CODE MODULATION

(75) Inventors: Jae-Seung Son, Suwon-si (KR); Tae-Han Bae, Seongnam-si (KR); Hyuk-Choon Kwon, Seoul (KR); Eun-Tae Won, Seoul (KR); Do-Young Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 378 days.

(21) Appl. No.: 12/626,086

(22) Filed: Nov. 25, 2009

(65) Prior Publication Data

US 2010/0135673 A1    Jun. 3, 2010

(30) Foreign Application Priority Data

Nov. 26, 2008  (KR) .................. 10-2008-0118239

(51) Int. Cl.
 *H04B 10/00* (2006.01)
(52) U.S. Cl. ........ 398/172; 398/158; 398/159; 398/183; 398/202
(58) Field of Classification Search .............. 398/172, 398/183, 158, 159, 140, 174, 192, 194, 202
See application file for complete search history.

(56) References Cited

U.S. PATENT DOCUMENTS

| | | | | |
|---|---|---|---|---|
| 5,384,519 A * | 1/1995 | Gotoh | ............................ | 315/324 |
| 6,342,897 B1 * | 1/2002 | Wen | ............................... | 345/589 |
| 7,050,121 B2 * | 5/2006 | Kim | ................................ | 348/744 |
| 7,081,925 B2 * | 7/2006 | Yang et al. | .................... | 348/655 |
| 7,446,779 B2 * | 11/2008 | Ikeda et al. | ..................... | 345/589 |
| 7,515,128 B2 * | 4/2009 | Dowling | .......................... | 345/83 |
| 7,689,130 B2 * | 3/2010 | Ashdown | ....................... | 398/172 |
| 7,848,569 B2 * | 12/2010 | Hu | ................. | 382/167 |
| 7,877,018 B2 * | 1/2011 | Ann | .............................. | 398/172 |
| 7,889,999 B2 * | 2/2011 | Ann | .............................. | 398/172 |
| 7,911,442 B2 * | 3/2011 | Wang et al. | ..................... | 345/102 |
| 8,030,840 B2 * | 10/2011 | Kaneda et al. | ................. | 313/503 |
| 2005/0055339 A1 * | 3/2005 | Richardson | ....................... | 707/3 |
| 2006/0139368 A1 * | 6/2006 | Kinoshita et al. | ............. | 345/590 |
| 2007/0058987 A1 * | 3/2007 | Suzuki | .......................... | 398/183 |
| 2008/0055339 A1 * | 3/2008 | Chao et al. | ..................... | 345/690 |
| 2008/0063410 A1 * | 3/2008 | Irie | .................. | 398/182 |
| 2008/0297456 A1 * | 12/2008 | Marcu et al. | .................... | 345/88 |
| 2008/0298811 A1 * | 12/2008 | Son et al. | ....................... | 398/172 |
| 2009/0171571 A1 * | 7/2009 | Son et al. | ....................... | 701/208 |
| 2010/0034540 A1 * | 2/2010 | Togashi | ......................... | 398/118 |
| 2011/0200338 A1 * | 8/2011 | Yokoi | ........................... | 398/158 |

* cited by examiner

*Primary Examiner* — Kenneth N Vanderpuye
*Assistant Examiner* — Hibret Woldekidan
(74) *Attorney, Agent, or Firm* — The Farrell Law Firm, P.C.

(57) ABSTRACT

A visible light communication system and method for transmitting and receiving an information symbol in a visible light communication system for a Color Code Modulation (CCM) scheme using a chromaticity diagram. The method includes determining a first coordinates value corresponding to an information symbol to be transmitted on the chromaticity diagram; determining a first color ratio corresponding to the first coordinates value; determining a second coordinates value corresponding to a compensation symbol for compensating for the first color ratio into a color white and determining a second color ratio corresponding to the second coordinates value; and emitting a visible ray corresponding to each of the first color ratio and second color ratio. The first and second coordinates values are located on a line on the chromaticity diagram.

25 Claims, 10 Drawing Sheets

APPARATUS AND METHOD FOR TRANSMITTING AND RECEIVING AN INFORMATION SYMBOL IN A VISIBLE LIGHT COMMUNICATION SYSTEM FOR COLOR CODE MODULATION

PRIORITY

This application claims priority under 35 U.S.C. §119(a) to a Korean Patent Application filed in the Korean Industrial Property Office on Nov. 26, 2008 and assigned Serial No. 10-2008-0118239, the content of which is incorporated herein by reference.

BACKGROUND OF THE INVENTION

1. Field of the Invention

The present invention relates generally to a visible light communication system, and more particularly to an apparatus and a method for transmitting and receiving an information symbol in a visible light communication system for a Color Code Modulation (CCM) scheme using a chromaticity diagram.

2. Description of the Related Art

A visible light communication system wirelessly transmits data using inside/outside lighting, a signboard, a traffic light, a streetlight, etc., using a Light Emitting Diode (LED). For example, visible light communication systems may be implemented in a hospital or an airplane, i.e., areas in which the use of Radio Frequency (RF) is normally restricted, and may also be used to provide additional product or service information using a signboard. Further, the visible light communication system may also be implemented in a Back Light Unit (BLU) of a Liquid Crystal Display (LCD) television, and used for high-speed data transmission because its frequency band is not limited under the Federal Communications Commission (FCC).

A visible light communication system emits visible lights rays corresponding to a blue, green, red, and white color of the LED through the CCM using a chromaticity diagram. The chromaticity diagram is a diagram illustrated according to the color specification established in a general meeting of Commission Internaitonale del'Eclairage in 1931.

According to the chromaticity diagram, every color is indicated with three parameters, i.e., x, y, and Y, measured by a spectrophotometer. Here, Y is light metering quantity that represents color brightness, and x and y represent the chromaticity. Chromaticity is a property of a color, except for its brightness (or luminance), and is represented as a center point in the x and y axis on the chromaticity diagram. By indicating the chromaticity of monochromatic light of each wavelength as a point on the chromaticity diagram, the indicated points being connected in a line, and the chromaticity points of pure purple and pure red-purple being connected, a horseshoe-shaped figure is generated on the chromaticity diagram including every color.

Figure 1:
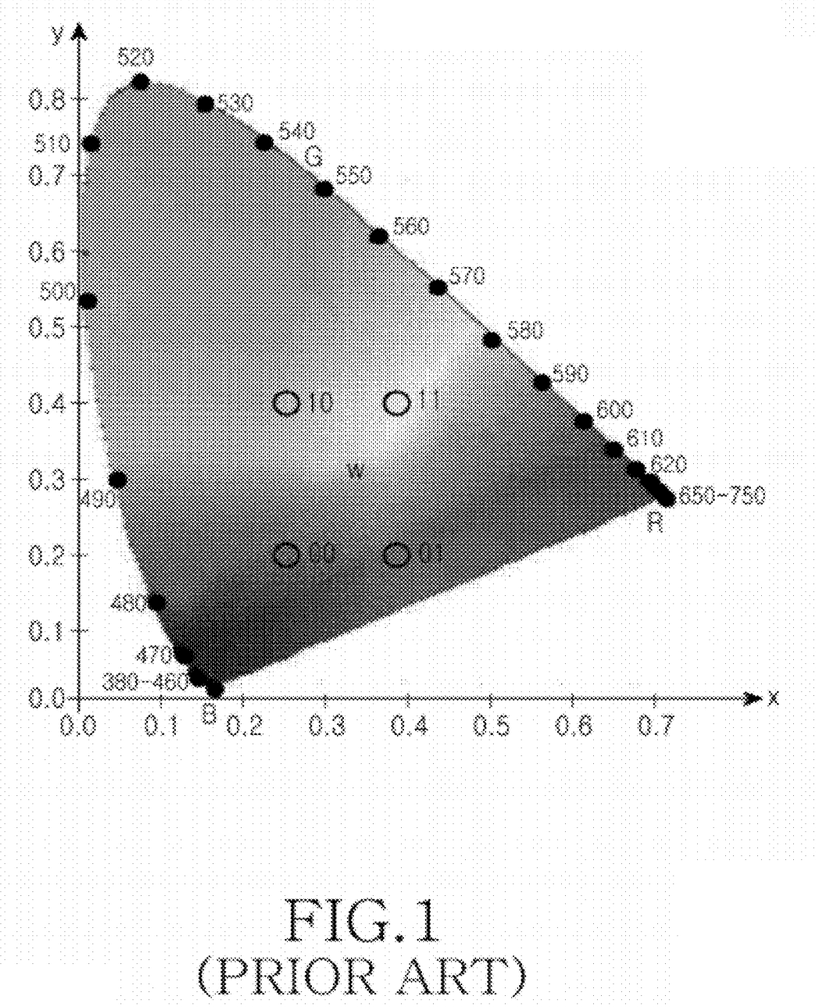
FIG. 1 is a chromaticity diagram illustrating a constellation used in a conventional CCM.
Figure 2:
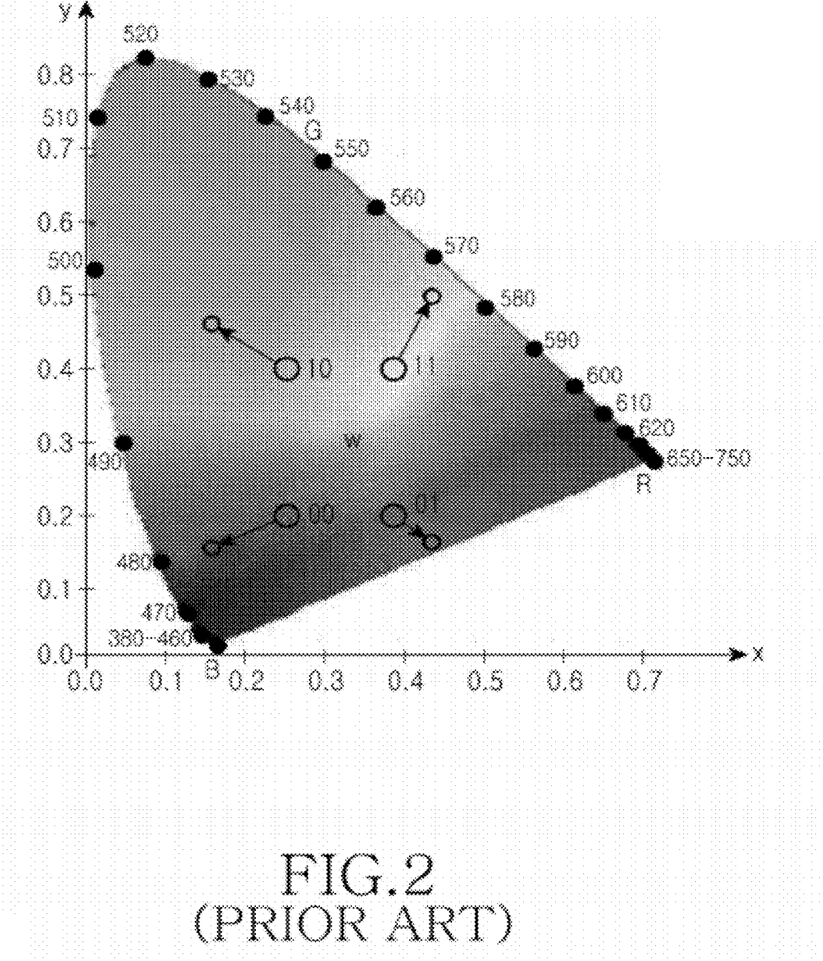
FIG. 2 is a chromaticity diagram illustrating a constellation that is arbitrarily moved in a conventional CCM.

FIG. 1 is a chromaticity diagram illustrating a constellation used in the conventional CCM and FIG. 2 is a chromaticity diagram illustrating a constellation arbitrarily moved in the conventional CCM. More specifically. FIGS. 1 and 2 illustrate a constellation in Quadrature Phase Shift Keying (QPSK) among the modulation schemes. The constellation in the present application refers to a point indicated according to a coordinates value corresponding to the modulation scheme on the chromaticity diagram.

Referring to FIG. 1, a constellation is located as symbols in a band displaying the color white, in order to solve the color balancing problem.

The communication performance (e.g., bit error rate) in the visible light communication system is improved as each point of the constellation moves farther away from each other on the chromaticity diagram. However, as illustrated in FIG. 2, if the constellation is arbitrarily moved, the distance between the points of the constellation increases, but the color between each point of the constellation is not balanced and fails to display the color white. Therefore, this deteriorates the advantage of the simultaneous implementation of the light and communication of the visible light communication system.

Further, if 8 PSK, 16 QAM (Quadrature Amplitude Modulation), 32 QAM, or 64 QAM modulation scheme is used for the high-speed data transmission, by using the constellation arbitrarily moved in the conventional CCM, color balancing cannot be maintained.

Further, if a high order modulation is used in each point of the conventional constellation to maintain the color balancing through using the constellation on the chromaticity diagram, modulation performance is degraded in comparison with a general high order modulation. That is, if the distance between each point of the constellation increases for improving the communication performance in the CCM of the conventional visible light communication system, this causes a problem in color balancing.

Accordingly, a need exists for a method capable of using high order modulation while maintaining color balancing when the distance between each point of a constellation is increased to improve communication performance in a CCM of a visible light communication system.

SUMMARY OF THE INVENTION

Accordingly, the present invention has been made to solve at least the above described problems occurring in the prior art, and an object of the present invention is to provide an apparatus and a method for transmitting and receiving an information symbol in a visible light communication system, which maintain color balancing even when each point of a constellation in a CCM is moved and use high order modulation.

In accordance with an aspect of the present invention, there is provided a method for transmitting an information symbol using a constellation defined corresponding to a modulation scheme on a chromaticity diagram of a visible light communication system. The method includes determining a first coordinates value corresponding to an information symbol to be transmitted on the chromaticity diagram; determining a first color ratio corresponding to the first coordinates value; determining a second coordinates value corresponding to a compensation symbol for compensating for the first color ratio into a color white; determining a second color ratio corresponding to the second coordinates value; and emitting a visible ray corresponding to each of the first color ratio and the second color ratio. The first and second coordinate values are located on a line on the chromaticity diagram.

In accordance with another aspect of the present invention, there is provided an apparatus for transmitting an information symbol using a constellation defined corresponding to a modulation scheme on a chromaticity diagram of a visible light communication system. The apparatus includes a color coding block for determining a first coordinates value corresponding to an information symbol to be transmitted on the chromaticity diagram; a coordinates calculator for determining a first color ratio corresponding to the first coordinates value, determining a second coordinates value corresponding to a compensation symbol for compensating for the first color ratio into a color white, and determining a second color ratio corresponding to the second coordinates value; and a light emitting unit for emitting a visible ray corresponding to each of the first color ratio and second color ratio. The first and second coordinates values are located on a line on the chromaticity diagram.

In accordance with another aspect of the present invention, there is provided a method for receiving an information symbol using a constellation defined corresponding to a modulation scheme on a chromaticity diagram of a visible light communication system. The method includes filtering a visible ray corresponding to a compensation symbol among visible rays transmitted from a transmission apparatus; receiving the visible ray corresponding to an information symbol; converting the received visible ray into an electric signal; determining a coordinates value corresponding to a color ratio of the converted electric signal on the chromaticity diagram; and decoding symbol information corresponding to the coordinates value. The compensation symbol has a color ratio for compensating for a color ratio of the information symbol into a color white on the chromaticity diagram, and the information symbol and compensation symbol are located in a line of the chromaticity diagram.

In accordance with another aspect of the present invention, there is provided an apparatus for receiving an information symbol using a constellation defined corresponding to a modulation scheme on a chromaticity diagram of a visible light communication system. The apparatus includes an optical filter for filtering a visible ray corresponding to a compensation symbol among visible rays transmitted from a transmission apparatus and receiving the visible ray corresponding to an information symbol; a light reception unit for converting the received visible ray into an electric signal; an RGB calculator for determining a coordinates value corresponding to a color ratio of the converted electric signal on the chromaticity diagram; and a decoding block for decoding symbol information corresponding to the coordinates value. The compensation symbol has a color ratio for compensating for a color ratio of the information symbol into a color white on the chromaticity diagram, and the information symbol and compensation symbol are located in a line of the chromaticity diagram.

In accordance with another aspect of the present invention, there is provided a method for receiving an information symbol using a constellation defined corresponding to a modulation scheme on a chromaticity diagram of a visible light communication system. The method includes converting a visible ray transmitted from a transmission apparatus into an electric signal; identifying if the converted electric signal is an information symbol or a compensation symbol based on a coordinates value corresponding to a color ratio of the converted electric signal in the chromaticity diagram; and decoding the information symbol. The compensation symbol has a color ratio for compensating for a color ratio of the information symbol into a color white on the chromaticity diagram, and the information symbol and compensation symbol are located in a line of the chromaticity diagram.

In accordance with another aspect of the present invention, there is provided an apparatus for receiving an information symbol using a constellation defined corresponding to a modulation scheme on a chromaticity diagram of a visible light communication system. The apparatus includes a light reception unit for converting a visible ray transmitted from a transmission apparatus into an electric signal; an RGB calculator for identifying if the converted electric signal is an information symbol or a compensation symbol based on a coordinates value corresponding to a color ratio of the converted electric signal in the chromaticity diagram and outputting the information symbol only; and a decoding block for decoding the information symbol outputted from the RGB calculator. The compensation symbol has a color ratio for compensating for a color ratio of the information symbol into a color white on the chromaticity diagram, and the information symbol and compensation symbol are located in a line of the chromaticity diagram.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Hereinafter, certain embodiments of the present invention will be described with reference to the accompanying drawings. In the following description, the same elements will be designated by the same reference numerals although they are shown in different drawings. In the following description, detailed explanation of known related functions and elements may be omitted to avoid unnecessarily obscuring the subject matter of the present invention.

In accordance with an embodiment of the present invention, data is transmitted at a high speed in a visible light communication system using an information symbol corresponding to input data and a compensation symbol for compensating for the information symbol in order to maintain color balancing, when a distance between each point of a constellation moves farther from each other in a Color Code Modulation (CCM). Here, the compensation symbol is used for increasing the distance between the information symbols and is characterized in that the compensation symbol has a color ratio for compensating for a color ratio of the information symbol into the color white on the chromaticity diagram.

Figure 3:
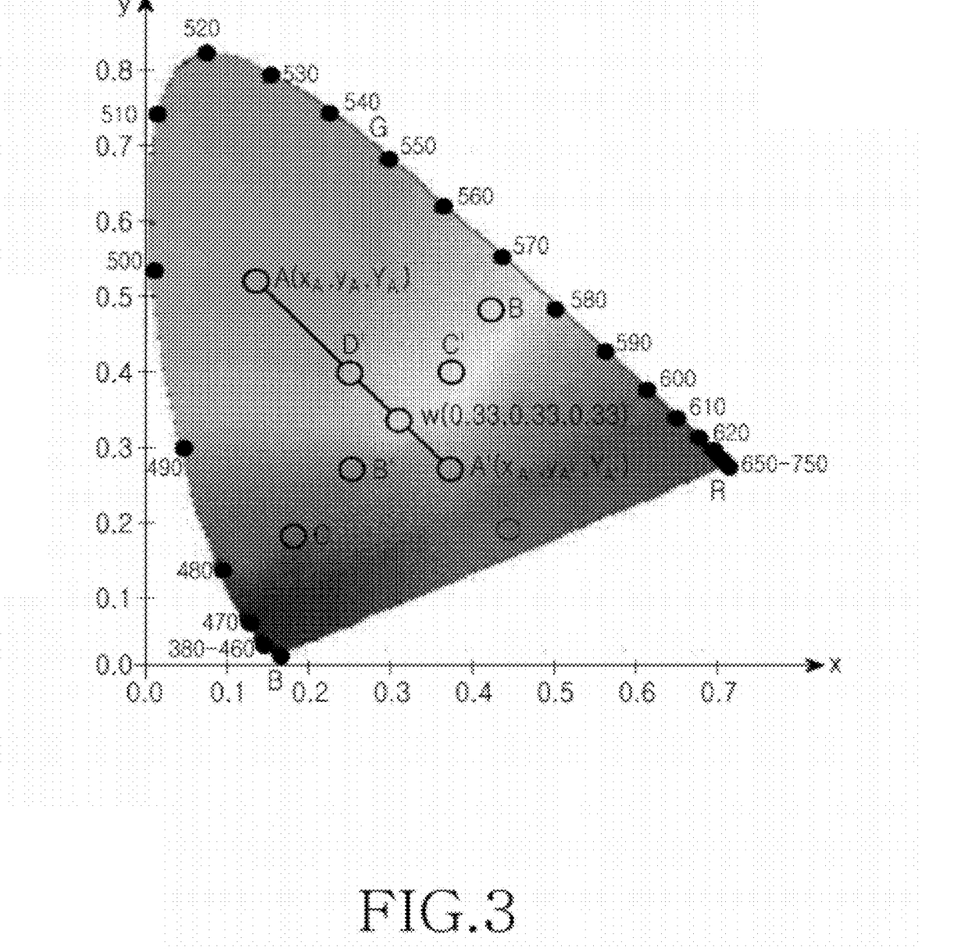
FIGS. 3 and 4 are chromaticity diagrams illustrating a scheme for maintaining color balancing between points of a constellation in a CCM of a visible light communication system according to an embodiment of the present invention.
Figure 4:
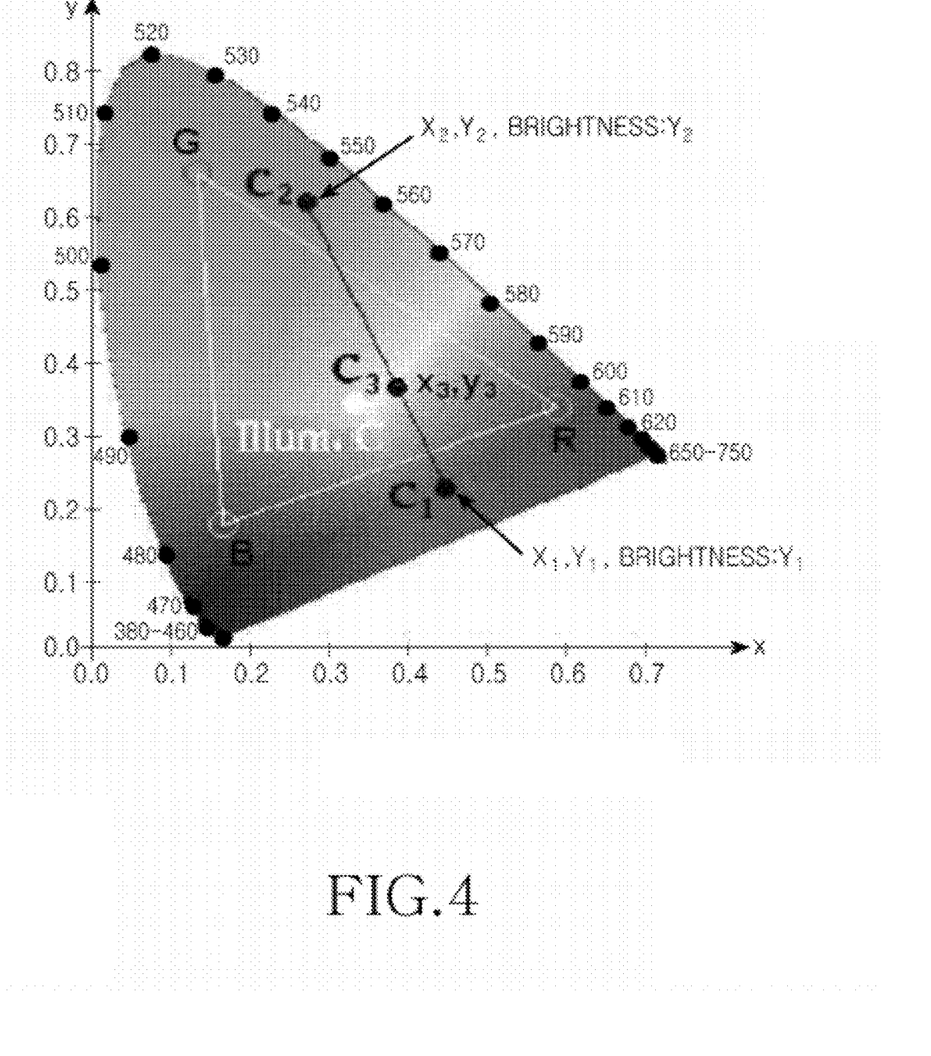

FIGS. 3 and 4 are chromaticity diagrams illustrating a scheme for maintaining color balancing between points of a constellation in a CCM of a visible light communication system according to the embodiment of the present invention. More specifically, FIGS. 3 and 4 illustrate the constellation for a QPSK modulation scheme. However, the present invention is also applicable to the high order modulation schemes (e.g., 8 PSK, 16 QAM, 32 QAM, 64 QAM), as well as the QPSK.

Referring to FIG. 3, the conventional visible light communication system uses each point of A', B', C', and D' of the constellation for communication. However, the visible light communication system according to an embodiment of the present invention suggests a method for using A, B, C, and D in the communication, by increasing a distance between each point, A', B', C', and D'. Further, in accordance with an embodiment of the present invention, A', B', C', and D' (compensation symbols) that have a color ratio are used for compensating a color ratio of A, B, C, and D (information symbols) into the color white in order to maintain the color balancing of A, B, C, D used for the communication through increasing the distance between each point of the constellation.

On the chromaticity diagram of FIG. 3, a coordinate value of the color white (W) is R, G, B=(0.333, 0.333, 0.333) and the sum of three values is 1. Further, every visible ray existing between two visible rays can be generated with the sum of two visible rays existing on a straight line on the chromaticity diagram. Therefore, the visible ray of the color white (W) can be generated with the sum of the visible rays of A and A' existing on the straight line of FIG. 3. Therefore, when the visible ray of A is compensated by using the visible ray of A' and the LED emits the visible ray of A, it is possible to maintain color balancing. That is, the visible ray of $C_3$(color white)$(x_3, y_3)$ in FIG. 4 is generated with the sum of the visible rays of $C_1$ and $C_{2s}$.

The coordinates value of $x_3, y_3$ corresponding to $C_3$ can be calculated by as shown in Equation (1). The value of $Y_1, Y_2$ in Equation (1) below represents the brightness of $C_1(x_1, y_1), C_2 (x_2, y_2)$. The brightness of the light resource represents an energy quantity of the visible ray reaching a unit area perpendicular to the ray existing in a unit distance from the light resource within a unit time.

$$x_3 = \frac{Y_1}{Y_1+Y_2}x_1 + \frac{Y_2}{Y_1+Y_2}x_2, \quad y_3 = \frac{Y_1}{Y_1+Y_2}y_1 + \frac{Y_2}{Y_1+Y_2}y_2 \quad (1)$$

According to Equation (1), the relation between A and A' can be represented as shown in Equation (2).

$$0.333 = \frac{Y_A}{Y_A+Y_{A'}}x_A + \frac{Y_{A'}}{Y_A+Y_{A'}}x_{A'}, \quad (2)$$

$$0.333 = \frac{Y_A}{Y_A+Y_{A'}}y_A + \frac{Y_{A'}}{Y_A+Y_{A'}}y_{A'}$$

That is, if $x_A, x_{A'}, y_A,$ and $y_{A'}$ are set based on Equation (2), it is possible to calculate the coordinates value of A' and the brightness ratio, $Y_A, Y_{A'}$. In contrast, if $Y_A, Y_{A'}$ are set and the modulation scheme is determined, it is possible to set $x_A, y_A$ so that $X_{A'}, y_{A'}$ can be calculated.

Figure 5A:
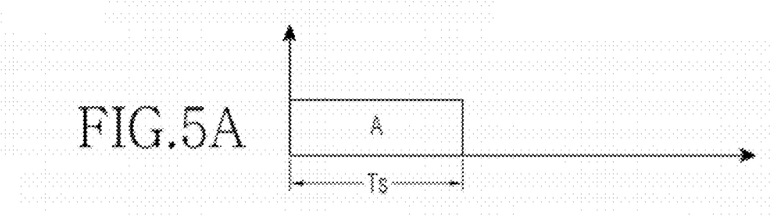
FIGS. 5A to 5C are diagrams illustrating an emission scheme of an LED in a visible light communication system according to an embodiment of the present invention.
Figure 5B:
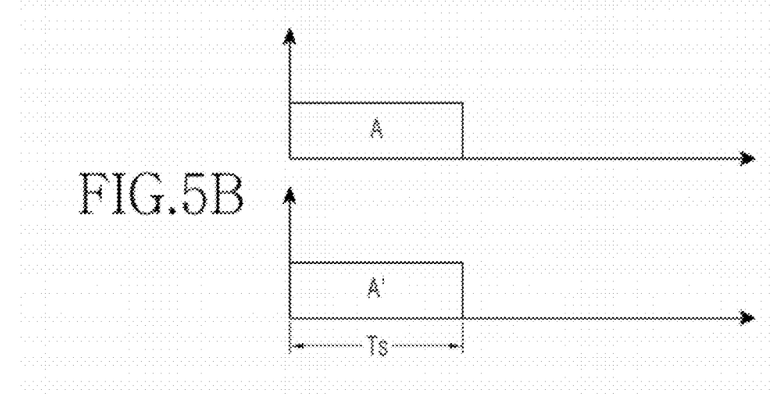
Figure 5C:
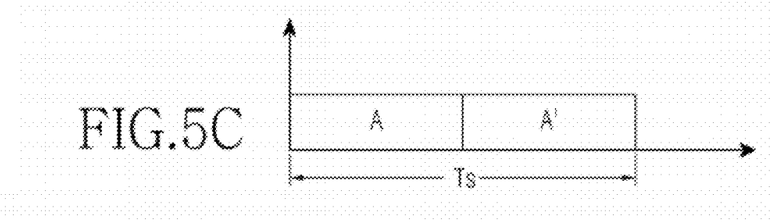

FIGS. 5A to 5C are diagrams illustrating an emission scheme of an LED in a visible light communication system according to an embodiment of the present invention.

Referring to FIG. 5A, the conventional LED emits the visible ray A during a symbol interval $(T_s)$ when transmitting the data symbol in the conventional CCM. However, the LED creates an optical illusion effect as seen in the color white.

Referring to FIG. 5B, the LED simultaneously emits the visible ray A when transmitting the signal and the visible ray A' compensating for the visible ray of A for the color balancing during the symbol interval $(T_s)$ at the same time.

Referring to FIG. 5C, the LED emits the visible ray A when transmitting the signal and subsequently emits the visible ray A' compensating for the visible ray A, while considering color balancing during the remaining time to use the optical illusion for the person's eyes. That is, the LED separately emits the visible ray A and the visible ray A' during the symbol interval $(T_s)$.

Figure 6:
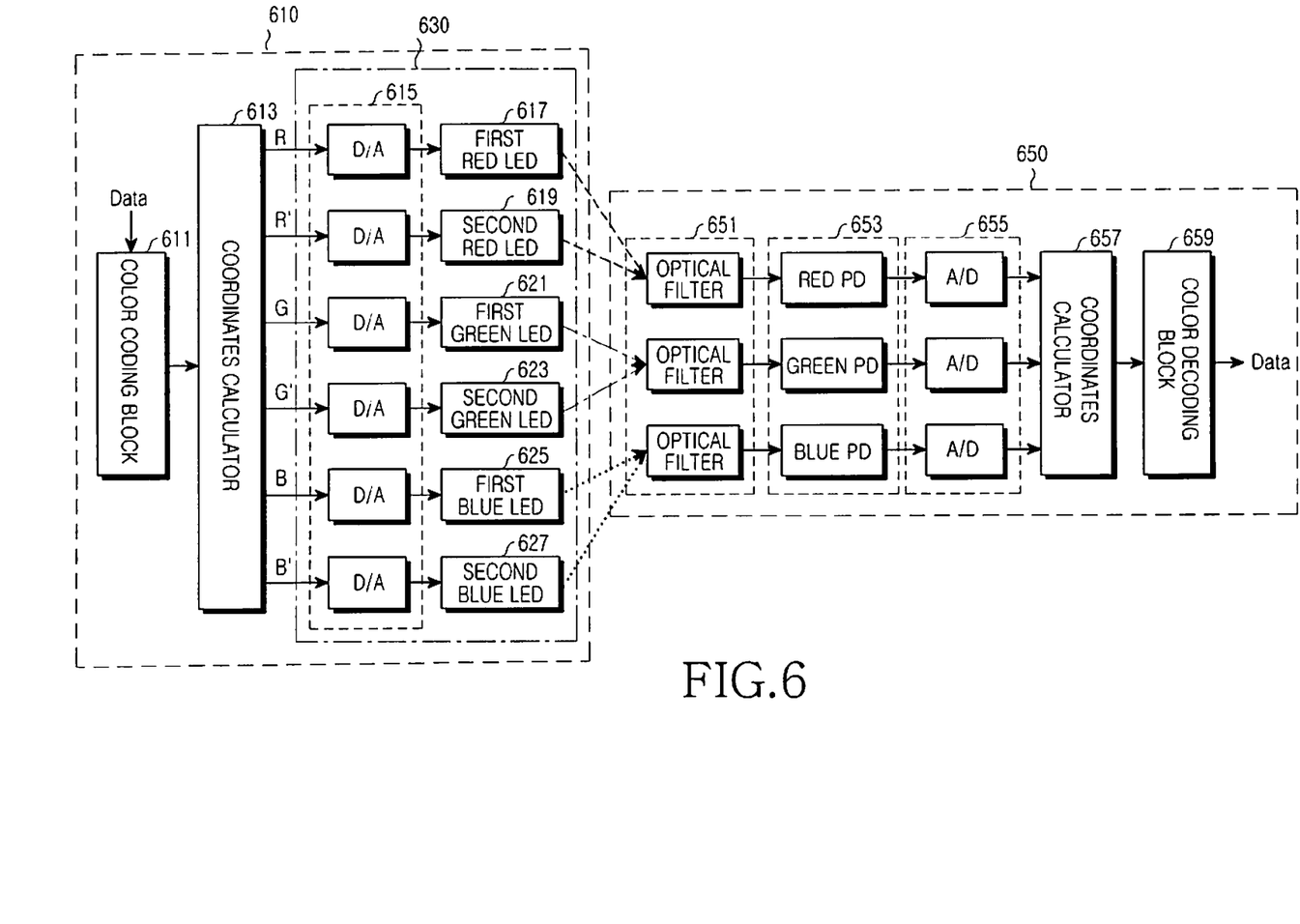
FIG. 6 is a diagram illustrating a visible light communication system according to an embodiment of the present invention.

FIG. 6 is a diagram illustrating a visible light communication system according to an embodiment of the present invention.

Referring to FIG. 6, the visible light communication system includes a visible light transmission apparatus 610 and a visible light reception apparatus 650.

The visible light transmission apparatus 610 includes a color coding block 611, a coordinates calculator 613, and a light emitting unit 630. The color coding block 611 of the visible light transmission apparatus 610 codes (maps) an input data into an information symbol on the chromaticity diagram. That is, the color coding block 611 converts the input data into a predetermined first coordinates value corresponding to the input data on the chromaticity diagram. For example, in the QPSK modulation of generating a signal point of one symbol for a 2-bit input, 4 signal points are set on the chromaticity diagram, such that the color coding block 611 outputs the first coordinates value corresponding to the 2-bit input data. The coordinates value has the value of (x, y).

The coordinates calculator 613 converts a second coordinates value into a ratio of the first R, G, B (hereinafter, referred to as "the color ratio") for the information symbol in order to emit the visible ray corresponding to the first coordinates value of the input data, i.e., the information symbol, in a first red LED 617, a first green LED 621, and a first blue LED 625.

The coordinates calculator 613 converts the first coordinates value into a first color ratio using Equation (3) representing a relation between the coordinates value of (x, y) and the color ratio.

$$X = 2.7689R + 1.7517G + 1.1302B \quad (3)$$

$$Y = R + 4.5907G + 0.0601B$$

$$Z = 0.0565G + 5.5943B$$

$$x = \frac{X}{X+Y+Z}$$

$$y = \frac{Y}{X+Y+Z}$$

The coordinates calculator 613 emits the visible ray corresponding to a compensation symbol for compensating for the information symbol in a second red LED 619, a second green LED 623, and a second blue LED 627. More specifically, the coordinates calculator 613 calculates a second coordinate value of the compensation symbol for compensating for a first color ratio corresponding to the first coordinate value into the color white using Equation (2) and then converts the second coordinates value into a second color ratio using Equation (3). The coordinates calculator 613 can transfer the second color ratio to a Digital/Analog (D/A) convertor 615 with reference to a pre-calculated table in accordance with another embodiment of the present invention.

The light emitting unit 630 includes the D/A convertor 615, the first and second red LEDs 617 and 619, the first and second green LEDs 621 and 623, and the first and second green LEDs 625 and 627, and performs a light strength modulation corresponding to each of the first color ratio and the second color ratio. Accordingly, the light emitting unit 630 emits the visible ray.

More specifically, the D/A convertor 615 converts a digital signal corresponding to each of the first and second color ratios into an analog signal, respectively. The first red LED 617, the first green LED 621, and the first blue LED 625 emit light by the analog signal corresponding to the first color ratio and the second red LED 619, the second green LED 623, and the second blue LED 627 emit light by the analog signal corresponding to the second color ratio. The first red LED 617, the first green LED 621, the first blue LED 625, second red LED 619, the second green LED 623, and the second blue LED 627 simultaneously emit the visible ray corresponding to each of the converted analog signals.

The visible light reception apparatus 650 includes an optical filter 651, a Photo Diode (PD) 653, an Analog/Digital (A/D) convertor 655, an RGB calculator 657, and a color decoding block 659.

The optical filter 651 of the visible light reception apparatus 650 passes only light of a specific wavelength band. Here, the specific wavelength band is determined by the type of the material added in manufacturing the optical filter 651. That is, the optical filter 651 filters the visible ray of the compensation symbol among the visible rays received from the visible light transmission apparatus 610 and receives the visible ray of the information symbol.

The PD 653 converts the visible ray of the information symbol received from the optical filter 651 into an electric signal.

The A/D convertor 655 converts an analog signal for the electric signal into a digital signal. The coordinates calculator 657 calculates s color ratio of the converted digital signal with the coordinates value on the chromaticity diagram using Equation (3), and the color decoding block 659 decodes the information symbol corresponding to the calculated coordinates value according to the CCM.

Figure 7:
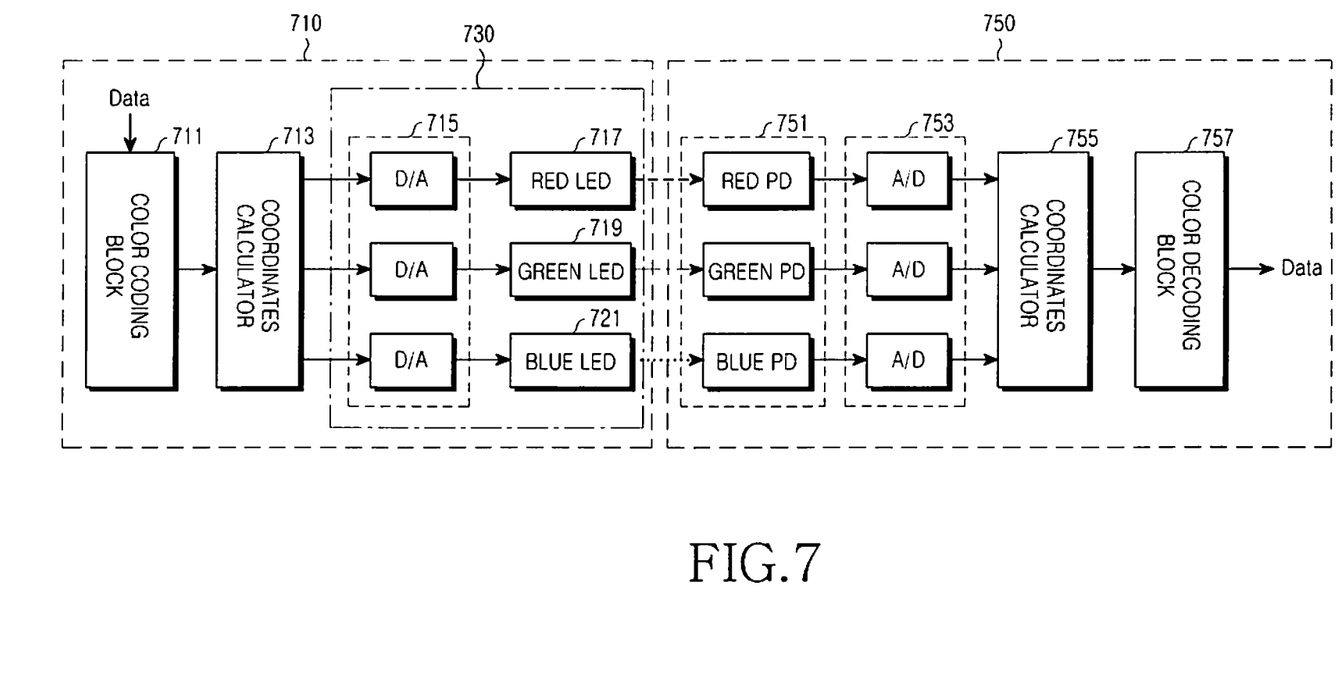
FIG. 7 is a diagram illustrating a visible light communication system according to another embodiment of the present invention.

FIG. 7 is a diagram illustrating a visible light communication system according to another embodiment of the present invention.

Referring to FIG. 7, the visible light communication system includes a visible light transmission apparatus 710 and a visible light reception apparatus 750.

The visible light transmission apparatus 710 includes a color coding block 711, a coordinates calculator 713, and a light emitting unit 730. The color coding block 711 of the visible light transmission apparatus 710 codes an input data into an information symbol corresponding to the constellation of the chromaticity diagram. That is, the color coding block 711 converts the input data into a predetermined first coordinates value of the chromaticity diagrams.

The coordinates calculator 713 converts the first coordinates value corresponding to the input data, i.e., the information symbol, into a first color ratio using Equation (3) and transfers the converted ratio to the D/A convertor 715. The coordinates calculator 713, in order to emit the visible ray of the compensation symbol for compensating for the information symbol, after emitting the visible ray of the information symbol, calculates a second coordinates value of the compensation symbol for compensating for the first color ratio corresponding to the first coordinates value into the color white using Equation (2), converts the second coordinates value into a second color ratio using Equation (3), and transfers the converted ratio to the D/A convertor 715. In accordance with another embodiment of the present invention, the coordinates calculator 713 may transfer the second color ratio to a D/A convertor 715 with reference to a pre-calculated table. The coordinates calculator 713 sequentially outputs the first color ratio of the information symbol and the second color ratio of the compensation symbol in a single symbol interval.

The light emitting unit 730 includes the D/A convertor 715, a red LED 717, a green LED 719, and a blue LED 721 and emits the visible ray corresponding to each of the first color ratio and the second color ratio. That is, the D/A convertor 715 converts the digital signal corresponding to the first color ratio and the second color ratio received from the coordinates calculator 713 into the analog signal.

The red LED 717, the green LED 719, and the blue LED 721 emit the visible ray according to the converted analog signal. That is, the red LED 717, the green LED 719, and the blue LED 721 sequentially emit the visible ray for the information symbol in a single symbol interval and then emit the visible ray for the compensation symbol.

The visible light reception apparatus 750 includes a PD 751, an A/D convertor 753, a coordinates calculator 755, and a color decoding block 757. The PD 751 converts the visible ray received from the visible light transmission apparatus 710 into an electric signal. That is, the PD 751 converts the visible ray transmitted from the red LED 717, the green LED 719, and the blue LED 721 into the electric signal. An optical filter is installed in a front end of the PD 651 to receive the visible ray based on the color.

The A/D convertor 753 converts the analog signal for the electric signal into the digital signal, and the coordinates calculator 755 calculates the coordinates value for each of the information symbol and compensation symbol based on the converted digital signal.

The visible light reception apparatus 750 receives the information symbol and then receives the compensation symbol such that it decodes the initially received information symbol.

Therefore, the coordinates calculator 755 identifies an area including the constellation corresponding to the calculated coordinates value on the chromaticity diagram and determines whether the constellation corresponding to the calculated coordinates value is the information symbol or the compensation symbol. If the constellation corresponding to the calculated coordinates value is the information symbol, the coordinates calculator 755 transfers the information symbol to the color decoding block 757, and if the constellation corresponding to the calculated coordinates value is the compensation symbol, the coordinates calculator 755 removes the compensation symbol.

Finally, the color decoding block 757 decodes the coordinates value corresponding to the information symbol according to the CCM.

Figure 8:
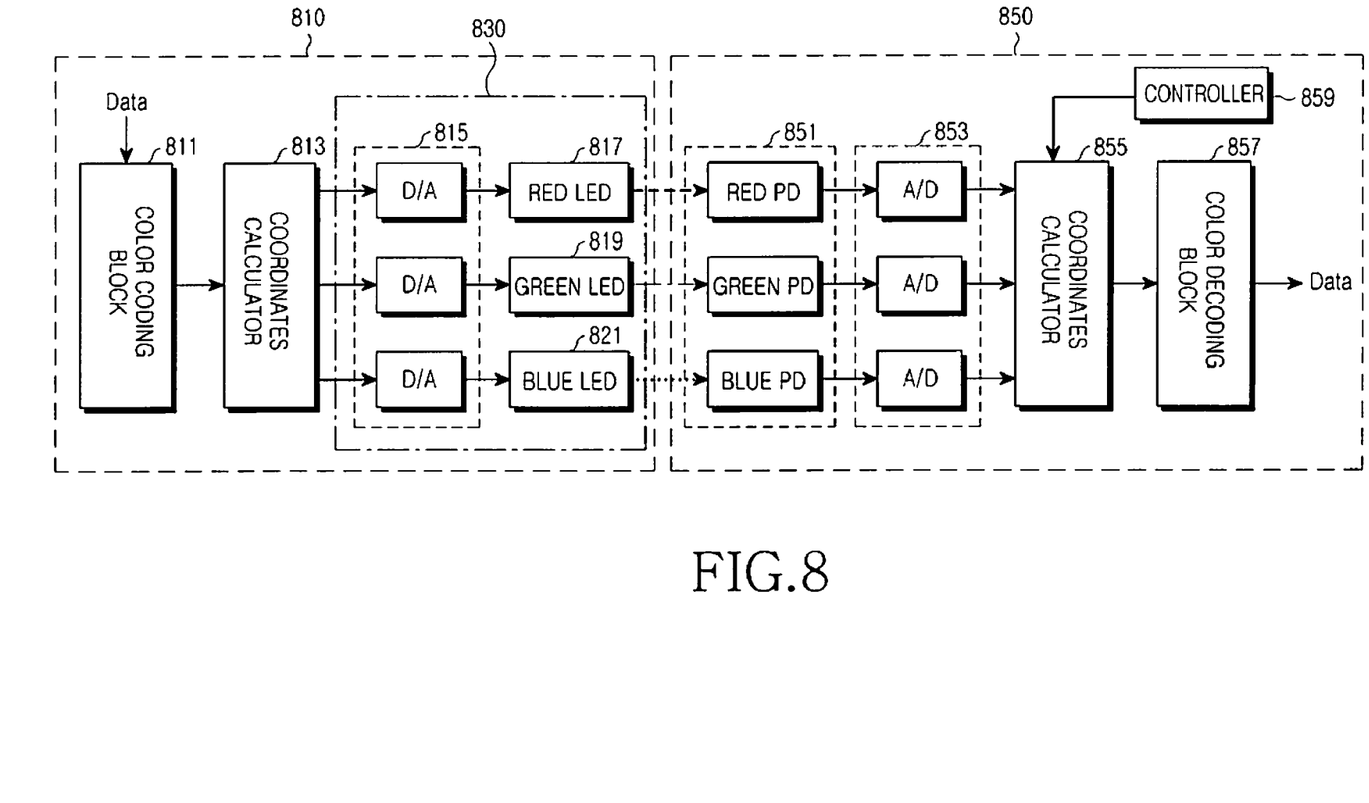
FIG. 8 is a diagram illustrating a visible light communication system according to another embodiment of the present invention.

FIG. 8 is a diagram illustrating a visible light communication system according to an embodiment of the present invention.

Referring to FIG. 8, the visible light communication system includes a visible light transmission apparatus 810 and a visible light reception apparatus 850.

A color coding block 811 of the visible light transmission apparatus 810 codes an input data into the information symbol according to the constellation of the chromaticity diagram. That is, the color coding block 811 converts the input data into a predetermined first coordinates value on the chromaticity diagram.

The coordinates calculator 813 converts the first coordinates value corresponding to the input data, i.e. the information symbol into a first color ratio using Equation (3) and transfers the converted first color ratio to the D/A convertor 815. In order to emit the visible ray of the information symbol and then the visible ray of the compensation symbol for compensating for the information symbol, the coordinates calculator 813 calculates a second coordinates value of the compensation symbol for compensating for the first color ratio corresponding to the first coordinates value into the color white using Equation (2), converts the converted second coordinates value into a second color ratio using Equation (3), and transfers the second color ratio to the D/A convertor 815. At The coordinates calculator 813 sequentially outputs the first color ratio of the information symbol and the second color ratio of the compensation symbol in a single symbol interval.

The light emitting unit includes the D/A convertor 815, a red LED 817, a green LED 819, and a blue LED 821 and emits the visible ray corresponding to each of the first color ratio and second color ratio. That is, the D/A convertor 815 converts the digital signal corresponding to the first color ratio and second color ratio received from the coordinates calculator 813 into the analog signal.

The red LED 817, the green LED 819, and the blue LED 821 emit the visible ray according to the converted analog signal. That is, the red LED 817, the green LED 819, and the blue LED 821 sequentially emit the visible ray for the information symbol and subsequently emit the visible ray for the compensation symbol in a single symbol interval.

The visible light reception apparatus 850 includes a PD 851, an A/D convertor 853, a coordinates calculator 855, a color decoding block 857, and a controller 859. The PD 851 converts the visible ray received from the transmission apparatus into an electric signal. That is, the PD 851 converts the visible ray transmitted from the red LED 817, the green LED 819, and the blue LED 821 into the electric signal. An optical filter is installed in a front end of the PD 851 to receive the visible ray based on the color.

Further, the A/D convertor 853 converts the analog signal for the electric signal into the digital signal, and the coordinates calculator 855 calculates the coordinates value for each of the information symbol and compensation symbol based on the converted digital signal.

The visible light reception apparatus 850 receives the information symbol first and then receives the compensation symbol such that it may decode the initially received information symbol. Therefore, the controller 859 controls the visible light reception apparatus 850 so as to stop the operation of the visible light reception apparatus 850 during the interval of receiving the predetermined compensation symbol ((c) as illustrated in FIG. 5).

Figure 9:
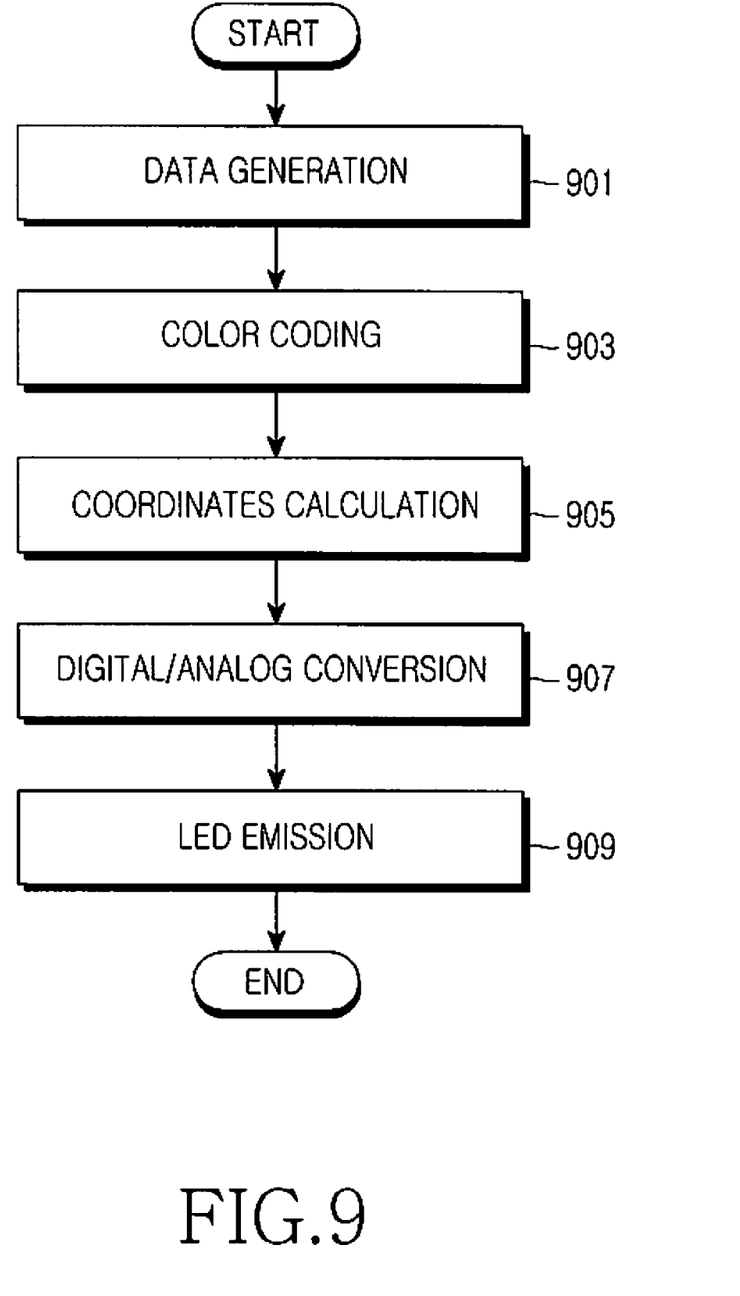
FIG. 9 is a flowchart illustrating a visible light transmission method according to embodiments of the present invention.

FIG. 9 is a flowchart illustrating a visible light transmission method according to an embodiment of the present invention.

Referring to FIG. 9, a transmission apparatus generates data to be transmitted in step 901. A color coding block codes the generated data into a first coordinates value corresponding to an information symbol on the chromaticity diagram in step 903. In step 905, a coordinates calculator calculates the first coordinates value corresponding to the information symbol as the first color ratio using Equation (3) and calculates the second coordinates value and the second color ratio using Equations (2) and (3) in order to compensate for the first color ratio corresponding to the first coordinates value into the first color ratio. The coordinates calculator illustrated in FIG. 6 calculates the first color ratio of the information symbol and the second color ratio of the compensation symbol and simultaneously transfers them to the D/A converter. However, the coordinates calculators illustrated in FIGS. 7 and 8 calculates the first color ratio of the information symbol and the second color ratio of the compensation symbol and transfers them to the D/A converter in a single symbol interval.

The D/A converter converts the digital signal corresponding to the transferred color ratio into the analog signal, respectively, in step 907. The LED emits light according to the color ratio of each symbol corresponding to the converted analog signal. That is, an LED as illustrated in FIG. 6 emits the visible ray corresponding to the information symbol and the compensation symbol at the same time. Alternatively, an LED as illustrated in either of FIGS. 7 and 8 emits the visible ray corresponding to the information symbol and the compensation symbol in a single symbol interval, respectively.

Figure 10:
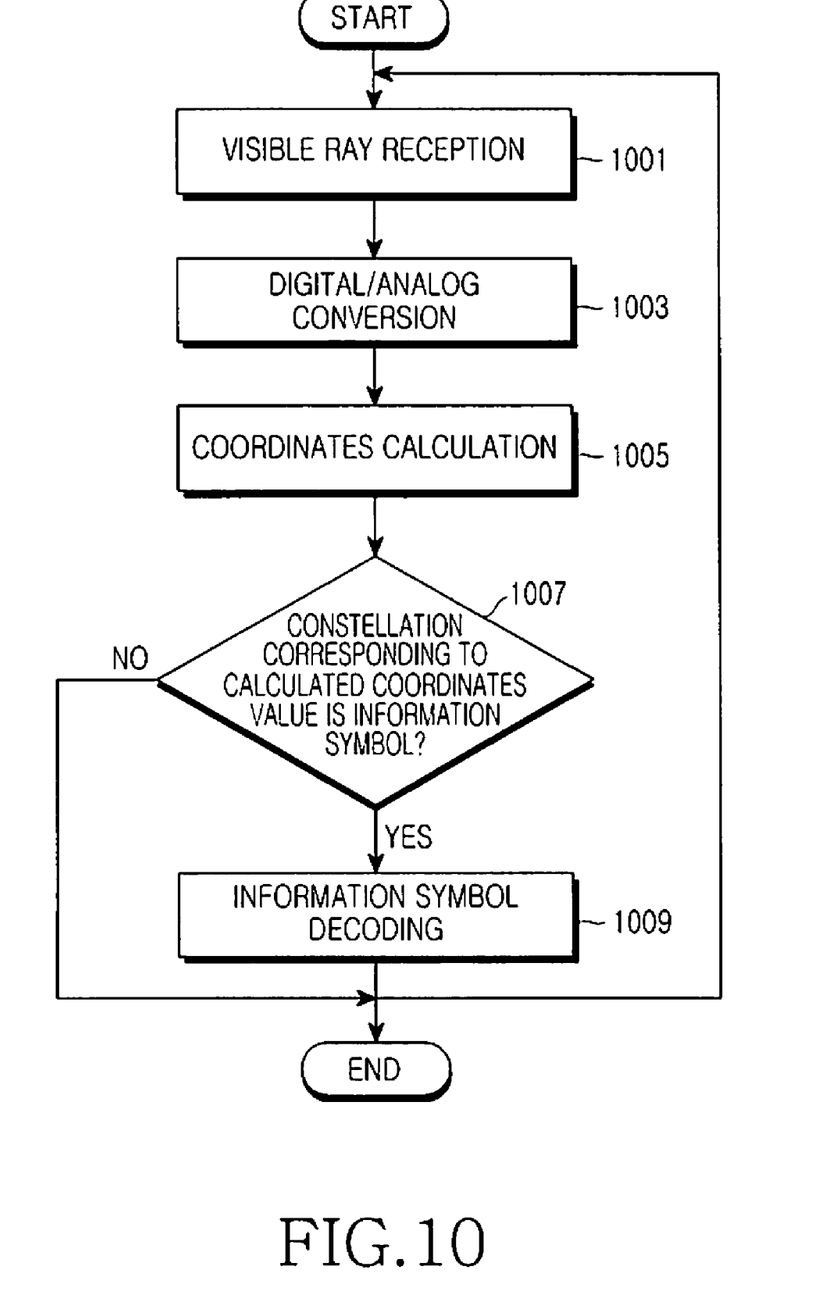
FIG. 10 is a flowchart illustrating a visible light reception method according to embodiments of the present invention.

FIG. 10 is a flowchart illustrating a visible light reception method according to an embodiment of the present invention.

Referring to FIG. 10, a PD receives a visible ray transmitted from a visible light transmission apparatus and converts the received visible ray into an electric signal in step 1001. Here, a PD as illustrated in FIG. 6 receives only the information symbol filtered from the optical filter 651 to convert the received information symbol into the electric signal.

In step 1003, an A/D convertor converts the analog signal for the electric signal into the digital signal.

A coordinates calculator calculates the coordinate value for each of the information symbol and compensation symbol based on the output signal of the PD converted into the digital signal using Equation (3) in step 1005.

In step 1007, the coordinates calculator determines whether the constellation corresponding to the calculated coordinates value is the information symbol or the compensation value using the area including the constellation corresponding to the calculated coordinates value on the chromaticity diagram. If the constellation corresponding to the calculated coordinates value is the information symbol, it proceeds to step 909, and if the constellation corresponding to the calculated coordinates value is the compensation symbol, the step is interrupted.

A PD as illustrated in FIG. 6 receives only the information symbol filtered from the optical filter 651, as described above, such that it is possible to directly proceed from step 1005 to step 1009 without performing step 1007.

The color decoding block decodes the information symbol according to the CCM in step 1009. In a visible light communication system as illustrated in FIG. 6 or 8, the method is completed after performing step 1009, and in a visible light communication system as illustrated in FIG. 7, after performing step 1009 and the method returns to step 1001 to receive light for the compensation symbol.

According to the above-described embodiments of the present invention, it is possible to achieve high speed data transmission using high order modulation, while maintaining color balancing in a CCM of a visible light communication system.

While the present invention has been shown and described with reference to certain embodiments and drawings thereof, it will be understood by those skilled in the art that various changes in form and description may be made therein without departing from the spirit and scope of the present invention.

What is claimed is:

1. A method for transmitting an information symbol using a constellation defined corresponding to a modulation scheme on a chromaticity diagram of a visible light communication system, the method comprising the steps of:
- determining a first coordinates value corresponding to the information symbol to be transmitted on the chromaticity diagram;
- determining a first color ratio corresponding to the first coordinates value;
- determining a second coordinates value corresponding to a compensation symbol for compensating for the first color ratio into a color white;
- determining a second color ratio corresponding to the second coordinates value; and
- emitting a visible ray corresponding to each of the first color ratio and the second color ratio,
- wherein the first and the second coordinates values are located on a line in the chromaticity diagram.

2. The method as claimed in claim 1, wherein coordinates corresponding to the color white on the chromaticity diagram are located between the first coordinates value and the second coordinates value on the line.

3. The method as claimed in claim 1, the second coordinates value is determined using a ratio of a predetermined light source brightness of the information symbol and light source brightness of the compensation symbol and the first coordinates value.

4. The method as claimed in claim 1, wherein emitting the visible ray comprises simultaneously emitting light corresponding to each of the first color ratio and the second color ratio.

5. The method as claimed in claim 1, wherein emitting the visible ray comprises sequentially emitting light corresponding to each of the first color ratio and the second color ratio in a single symbol interval.

6. The method as claimed in claim 1, wherein the first and second color ratios are defined according to a ratio between a color red (R), green (G), and blue (B).

7. An apparatus for transmitting an information symbol using a constellation defined corresponding to a modulation scheme on a chromaticity diagram of a visible light communication system, comprising:
- a color coding block for determining a first coordinates value corresponding to the information symbol to be transmitted on the chromaticity diagram;
- a coordinates calculator for determining a first color ratio corresponding to the first coordinates value, determining a second coordinates value corresponding to a compensation symbol for compensating for the first color ratio into a color white, and determining a second color ratio corresponding to the second coordinates value; and
- a light emitting unit for emitting a visible ray corresponding to each of the first color ratio and the second color ratio,
- wherein the first and the second coordinates values are located on a line in the chromaticity diagram.

8. The apparatus as claimed in claim 7, wherein coordinates corresponding to the color white on the chromaticity diagram are located between the first coordinates and the second coordinates on the line.

9. The apparatus as claimed in claim 7, wherein the coordinates calculator determines the second coordinates value using a ratio of a predetermined light source brightness of the information symbol and light source brightness of the compensation symbol and the first coordinates value.

10. The apparatus as claimed in claim 7, wherein the light emitting unit comprises:
- a digital/analog convertor for converting a digital signal corresponding to each of the first color ratio and the second color ratio into an analog signal; and
- light emitting devices for emitting light according to the analog signal corresponding to the first color ratio and for emitting light according to the analog signal corresponding to the second color ratio.

11. The apparatus as claimed in claim 7, wherein the light emitting unit comprises:
- a digital/analog convertor for converting a digital signal corresponding to each of the first color ratio and the second color ratio into an analog signal; and
- light emitting devices for emitting light according to the analog signal corresponding to the first color ratio and subsequently emitting light according to the analog signal corresponding to the second color ratio.

12. The apparatus as claimed in claim 7, wherein the first and the second color ratios are defined according to a ratio between a color red (R), green (G), and blue (B).

13. A method for receiving an information symbol using a constellation defined corresponding to a modulation scheme on a chromaticity diagram of a visible light communication system, the method comprising the steps of:
- filtering a visible ray corresponding to a compensation symbol among visible rays transmitted from a transmission apparatus;
- receiving the visible ray corresponding to the information symbol;
- converting the visible ray into an electric signal;
- determining a coordinates value corresponding to a color ratio of the electric signal on the chromaticity diagram; and
- decoding symbol information corresponding to the coordinates value,
- wherein the compensation symbol has a color ratio for compensating the color ratio of the information symbol into a color white on the chromaticity diagram, and
- wherein the information symbol and the compensation symbol are located in a line in the chromaticity diagram.

14. The method as claimed in claim 13, wherein the color ratio is defined according to a ratio between a color red (R), green (G), and blue (B).

15. The method as claimed in claim 13, wherein the visible ray corresponding to the information symbol and the visible ray corresponding to the compensation symbol are simultaneously or sequentially output from the transmission apparatus in a single symbol interval.

16. An apparatus for receiving an information symbol using a constellation defined corresponding to a modulation scheme on a chromaticity diagram of a visible light communication system, comprising:
- an optical filter for filtering a visible ray corresponding to a compensation symbol among visible rays transmitted from a transmission apparatus and receiving the visible ray corresponding to the information symbol;
- a light reception unit for converting the visible ray into an electric signal;
- an RGB calculator for determining a coordinates value corresponding to a color ratio of the electric signal on the chromaticity diagram; and
- a decoding block for decoding symbol information corresponding to the coordinates value,
- wherein the compensation symbol has a color ratio for compensating the color ratio of the information symbol into a color white on the chromaticity diagram, and
- wherein the information symbol and the compensation symbol are located in a line in the chromaticity diagram.

17. The apparatus as claimed in claim 16, wherein the color ratio is defined according to a ratio between a color red (R), green (G), and blue (B).

18. The apparatus as claimed in claim 16, wherein the visible ray corresponding to the information symbol and the visible ray corresponding to the compensation symbol are sequentially or simultaneously output from the transmission apparatus in a single symbol interval.

19. A method for receiving an information symbol using a constellation defined corresponding to a modulation scheme on a chromaticity diagram of a visible light communication system, the method comprising the steps of:
   converting a visible ray transmitted from a transmission apparatus into an electric signal;
   identifying if the electric signal is an information symbol or a compensation symbol, based on a coordinates value corresponding to a color ratio of the electric signal in the chromaticity diagram; and
   decoding the information symbol,
   wherein the compensation symbol has a color ratio for compensating the color ratio of the information symbol into a color white on the chromaticity diagram, and
   wherein the information symbol and the compensation symbol are located in a line in the chromaticity diagram.

20. The method as claimed in claim 19, wherein the color ratio is defined according to a ratio between a color red (R), green (G), and blue (B).

21. The method as claimed in claim 19, wherein the visible ray corresponding to the information symbol and the visible ray corresponding to the compensation symbol are sequentially or simultaneously output from the transmission apparatus in a single symbol interval.

22. The method as claimed in claim 19, wherein, after decoding, converting is not performed during a time of receiving a predetermined compensation symbol.

23. An apparatus for receiving an information symbol using a constellation defined corresponding to a modulation scheme on a chromaticity diagram of a visible light communication system, the method comprising the steps of:
   a light reception unit for converting a visible ray transmitted from a transmission apparatus into an electric signal;
   an RGB calculator for identifying if the electric signal is an information symbol or a compensation symbol based on a coordinates value corresponding to a color ratio of the electric signal in the chromaticity diagram and outputting the information symbol; and
   a decoding block for decoding the information symbol,
   wherein the compensation symbol has a color ratio for compensating the color ratio of the information symbol into a color white on the chromaticity diagram, and
   wherein the information symbol and the compensation symbol are located in a line in the chromaticity diagram.

24. The apparatus as claimed in claim 23, wherein the color ratio is defined according to a ratio between a color red (R), green (G), and blue (B).

25. The apparatus as claimed in claim 23, wherein the visible ray corresponding to the information symbol and the visible ray corresponding to the compensation symbol are sequentially to simultaneously output from the transmission apparatus in a single symbol interval.

* * * * *